Dec. 16, 1924.
P. T. ILLIG
1,519,453
DEMOUNTABLE RIM RETAINER
Filed March 18, 1921   2 Sheets—Sheet 1
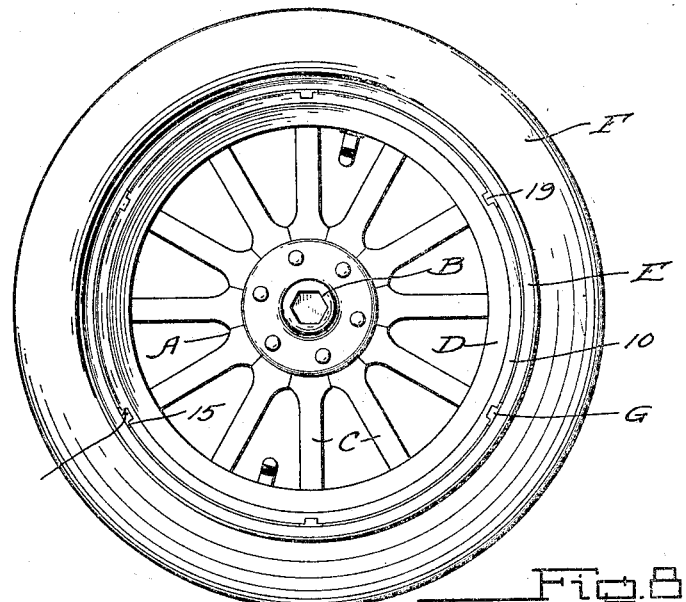
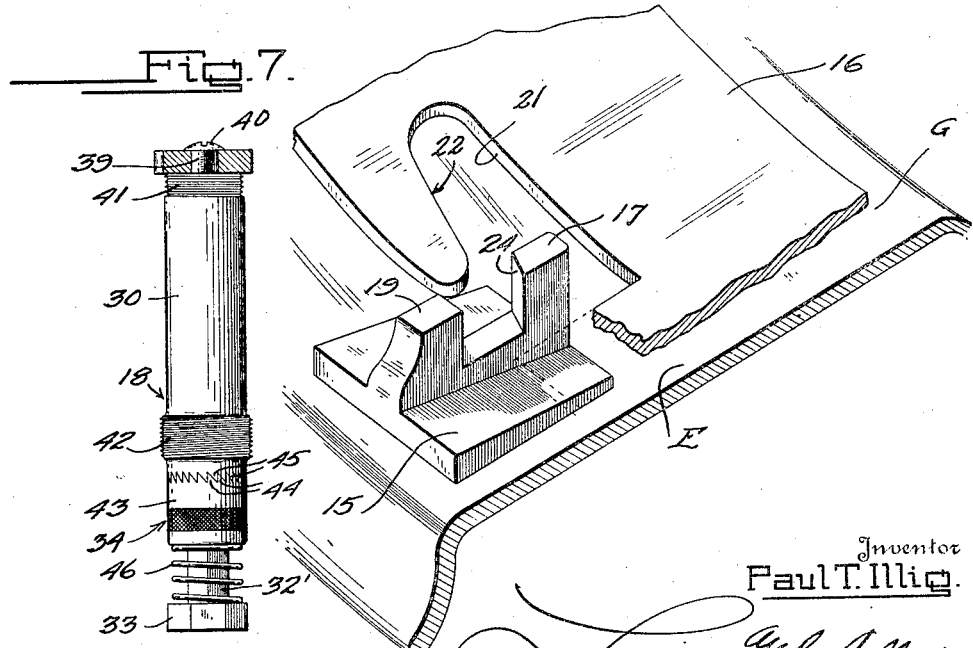
Inventor
Paul T. Illig.
By Lancaster and Allwein
Attorneys

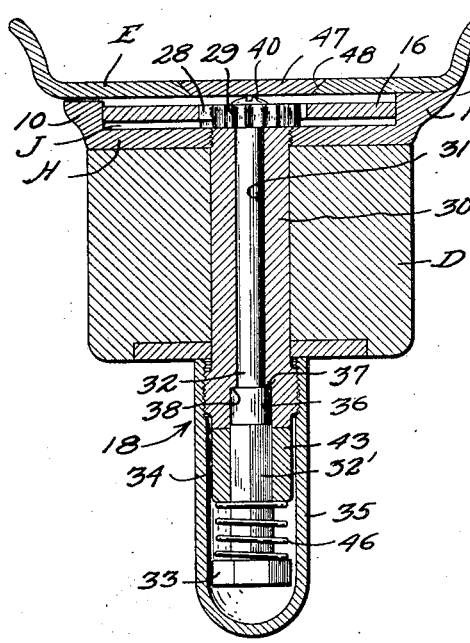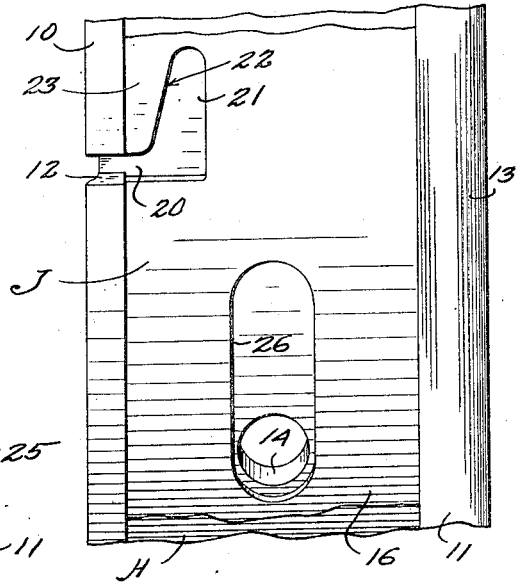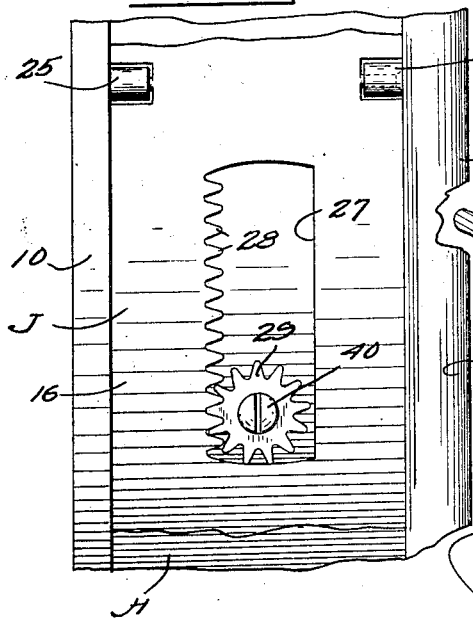

Patented Dec. 16, 1924.

1,519,453

UNITED STATES PATENT OFFICE.

PAUL T. ILLIG, OF EBENSBURG, PENNSYLVANIA.

DEMOUNTABLE-RIM RETAINER.

Application filed March 18, 1921. Serial No. 453,340.

*To all whom it may concern:*

Be it known that I, PAUL T. ILLIG, a citizen of the United States, residing at Ebensburg, in the county of Cambria and State of Pennsylvania, have invented certain new and useful Improvements in Demountable-Rim Retainers, of which the following is a specification.

My present invention relates to vehicle wheels and more particularly to means for retaining the demountable rims thereof in operative relation to the main body portions of the wheels.

One of the principal objects of the invention is to provide a retaining means which will positively prevent circumferential movement of the demountable rim with respect to the main body portion of the wheel when the vehicle is moving either forwardly or backwardly and which will properly center the demountable rim in the plane of the main body portion of the wheel thus avoiding the wear upon pneumatic tire casings which so frequently results where the rims are not properly drawn or forced into place and have a wabbling appearance as the wheel rotates.

Another object of the invention is to provide a retainer by which the demountable rim may be quickly and conveniently placed into or removed from operative relation to the main body portion of the wheel, it being possible to effect a charge by the actuation of a single control device of the retainer and move the demountable rim with its tire axially of the wheel.

A further object of the invention is to provide a wheel embodying a demountable rim and retainer therefor which will have neat appearance and its parts so arranged as to not collect mud and sand.

Further objects and advantages of the invention will appear in the following detailed description, taken in connection with the accompanying drawings, forming a part of this specification, in which drawings:

Figure 1 is an elevation of a vehicle wheel equipped with a demountable rim retainer constructed according to the principle of my invention.

Fig. 2 is an enlarged cross sectional view through the wheel felly and demountable rim at the control device of the retainer of the latter.

Fig. 3 is an enlarged fragmentary view in plan of a portion of the retainer at its control device.

Fig. 4 is a view similar to Fig. 2 at a different portion of the rim and felly, showing anti-friction devices.

Fig. 5 is a view similar to Fig. 3 showing the way in the retainer and felly for the usual valve stem of the pneumatic tire.

Fig. 6 is an enlarged fragmentary view in section transversely of the wheel rim portion showing interfitting parts adapted to draw the demountable rim into central relation to the main body portion of the wheel.

Fig. 7 is a detail view in elevation of a portion of the retainer control device.

Fig. 8 is a perspective view of portions of the demountable rim, and its retainer and disclosing the cooperation of interfitting parts adapted to draw and retain the rim in place.

In the drawings, wherein similar characters refer to similar parts throughout the several views, A designates the main body portion of the wheel, which, in the example shown includes a hub B, spokes C and felly D of ordinary construction; E a demountable rim which may be of any preferred construction or formation, in the example shown being for the so called straight side tire designated by character F; and G the retainer for drawing and securing the demountable rim to the main body portion of the wheel.

The retainer G comprises a bearing ring H rigid with the main body portion A of the wheel, and means designated generally by the character J, for drawing and holding the demountable rim E in fixed relation to the bearing ring H.

The bearing ring H is preferably of endless formation, and made rigid to the felly D, in any suitable manner, such as by shrinking, or by bolts, in the usual manner, one of the bolts being indicated at 9 in Figure 4 of the drawing. The ring is provided with spaced apart circumferentially extending peripheral flanges 10 and 11, the former being provided with a plurality of transverse ways 12, for a purpose to be subsequently set forth. The flange 11 acts as an abutment, having a seat 13 for the demountable rim E. These transverse ways 12 may either be provided by stamping, when forming the bearing ring, or a portion of the flange 10 may be removed, at various spaced apart intervals, thus dividing the flange 10 into a plurality of arcuate segmental flanges, as clearly shown in Figure 1 of the drawing. The bearing ring is provided with an aperture 14, through which the valve stem, (not shown in the drawings), of the pneumatic tire F, may extend. This bearing ring is adapted to receive the demountable rim E, which is brought into wedging engagement with the bearing ring, when the demountable rim is moved axially of the wheel, in one direction. In order that this demountable rim may firmly engage both flanges of the bearing ring, the former may be provided with a plurality of wedges 15, at its internal periphery, positioned to gradually engage, with increasing pressure, the flange 10, when the rim is moved axially in one direction, with respect to the wheel, and are adapted to firmly support the demountable rim on the flange 10, when the opposite portion of the demountable rim is firmly disposed on the seat 13 of flange 11.

The means J for drawing and holding the demountable rim E in fixed relation to the bearing ring H, and hence to the main body portion A of the wheel comprises interlocking devices 16 and 17, the former being carried by the bearing ring, and the latter by the demountable rim; a control device designated generally by the character 18, by which the device 16 may be operated, and held in a fixed position; and lugs 19 adapted to fit in the said ways 12 when the demountable rim is in place on the wheel.

In the example shown, the lugs 19 are formed integral with the wedges 15, although this is not absolutely necessary, but provides for economical construction, and the lugs are preferably shaped similar to the cross section of flanges 10, so as to present a neat appearance when the demountable rim is in place and so as to not provide projections, liable to accumulate mud. These lugs, extending radially from the internal periphery of the demountable rim are adapted to prevent circumferential movement of the demountable rim with respect to the bearing ring during operation of the wheel, and effectively prevent this movement, no matter whether the wheel moves forwardly or rearwardly in the path of travel.

The device 16 is of ring like formation, and may be termed the locking ring in that it is moved in order to interlock with devices 17. The devices 17 are preferably of wedge like formation, and may also be formed integral with the wedges 15, extending from the internal periphery of the demountable rim, and in alignment with the lugs 19 so that when disposing the demountable rim on the bearing ring, these wedges 17 may pass through the ways 12. For each wedge 17 there is provided in the locking ring 16 a transverse slot 20, and a circumferentially extending slot 21, these slots communicating in pairs to provide a plurality of L-shaped ways in spaced apart relation. The transverse slot 20 of each way is open to one edge of the locking ring, and the margin 22 of the circumferential slot 21 nearest to said edge is in diverging relation thereto, from the transverse slot 20, thus providing a wedge 23 for cooperation with wedge 17, the wedging face 24 of wedge 17 being in operative relation to the face 22 of slot 21 for drawing the demountable rim E into place.

If desired, both the wedge 17 and its adjacent lug 19 may be slightly tapered transversely of the wheel in order that the demountable rim may be manually pushed into place, with ease, the wedges 17 passing through the ways 12, and the lugs 19 seating in said ways as hereinbefore described.

It is to be observed that the locking ring 16 may be conveniently disposed between the flanges 10 and 11 and this ring is preferably provided with anti-friction rollers 25, which hold the locking ring in spaced relation to the main body portion of the bearing ring H, and the demountable rim E and facilitates the imparting of circumferential movement to the locking ring 16. This ring is also provided with an elongated slot 26 adjacent the opening 14 in the bearing ring for the accommodation of the pneumatic tire valve stem, not shown in the drawings, this slot being elongated so that the locking ring 16 may be readily moved circumferentially with respect to the bearing ring, without disturbing the valve stem. The locking ring is also provided with an elongated slot 27, disposed circumferentially thereof, preferably diametrically opposite to slot 26, this slot 27 being provided with a plurality of teeth 28, in rack-like formation at one of the walls of the slot 27. This rack is for cooperation with a pinion 29 of the control device 18.

In addition to including the pinion 29, and rack 28, the control device 18 comprises a shell 30, rigid with the bearing ring 8, the shell having an axial bore 31 radially of the wheel; a shaft 32 in bore 31, the shaft being provided with a polygonal head 33, whereby the shaft may be readily rotated, as by aid of a wrench; and a locking device designated generally by the character 34, by which circumferential movement of the shaft 32 may be prevented, in one direction. A suitable cap 35 may be provided to cover the headed portion of the shaft, and the locking device 34, this cap 35 simulating somewhat the usual cap provided for covering ordinary pneumatic valve stems. More specifically, in the example shown, the shaft 32 is provided with an enlarged portion 36, presenting a shoulder 37 adapted to engage a shoulder 38 in bore 31, so as to prevent longitudinal movement of the shaft in one direction. The pinion 29 may be secured to the reduced polygonal end portion 39 of shaft 32, as by a screw 40, the pinion 29 being disposed in slot 27 and co-meshing with the teeth 28. This pinion prevents movement of the shaft 32 in the other longitudinal direction. The shell 30 may be secured to the bearing ring H, as by screw threads indicated at 41 and the cap 35 may be secured to this shell, as by screw threads 42, the threads 41 and 42 being oppositely disposed, so that there is no tendency to disengage the shell 30 from the bearing ring H when turning the cap 35 into place or removing it. The device 34 comprises a clutch member 43, slidable longitudinally on a polygonal portion 32′ of shaft 32, this clutch member provided with teeth 44 which cooperate with teeth 45, formed on the exposed portion of shell 30; and a coil spring 46 interposed between the clutch member 43 and the head 33, the coil spring 46 being expansive in nature and having a tendency to yieldably retain the teeth 44 and 45 in engagement with one another.

It is preferred to provide a removable plate 47, carried by the demountable rim E, normally closing an aperture 48 aligned with the bore 31 in shell 30, the aperture 48 being of a size such as to permit the removal of screw 40 and pinion 39 in the event that operation of the locking ring 16 should become impossible, by means of the control device 18, in the event that some portion of the control device should break. The pneumatic tire under such conditions should be removed from the demountable rim, and the plate 47 removed, thus permitting the control devices to be dismembered and reassembled with any broken parts replaced.

In operation, assuming that the control device has been arranged so that the slots 20 align with the ways 12, the demountable rim is disposed so that its wedges 17 and lugs 19 are in alignment with the ways 12, whereupon the demountable rim, with its tire mounted thereon, is pushed axially of the wheel, the wedges 17 passing through the slots 20, so that their faces 24 are disposed in operative relation to the faces 22 of slots 21. The member 44 of device 34 is then moved against action of the spring 46, so as to disengage teeth 44 and 45, or they may be permitted to ride over one another, as movement is imparted to the head 33, as by the wrench or any other suitable device. The rotation imparted to the shaft 32 will in turn be imparted to pinion 29, which will cause the locking ring 16 to move circumferentially. The wedging portions 23 of the locking ring, engaging the wedges 17 will thus effectively draw the demountable rim so that it is in intimate contact with the bearing ring H. The locking device 34 will prevent counter movement of the shaft, under normal conditions, and when it is desired to remove the demountable rim, then it is necessary to actuate manually the member 43 of locking device 34, so as to disengage the teeth 44 and 45, whereupon the shaft 32, through its head 33 may be moved in the counter direction for releasing the wedging portion 23 of the locking ring and the wedges 17.

It is to be observed that a demountable rim may be quickly disposed into operative relation to or removed from engagement with the main body portion of the wheel, there being a single control device which draws the demountable rim into proper relation to the bearing ring and retains it in place. A quick change may be made, in the event of puncture, blow outs, or defective tire because of the ease with which the demountable rim may be released, and replaced. Most of the mechanism is concealed and hence not liable to resist removal after the demountable rim has remained on the main body portion of the wheel for a considerable length of time.

Changes in details may be made without departing from the spirit or scope of my invention; but,

I claim:

1. In a demountable rim construction for vehicle wheels the combination with a felly, of a bearing ring, a demountable rim, a locking ring circumferentially adjustable between the bearing ring and the demountable rim including means for engaging the rim, and a device for moving the locking ring relative to the felly to position the rim over the bearing ring including a shaft radially disposed for rotation in the felly, means on the shaft and locking ring to shift the latter, teeth rigid with the felly, a sleeve longitudinally slidable and non-rotatably mounted on said shaft having teeth thereon, and means normally urging the sleeve teeth into engagement with the teeth rigid with the felly whereby the shaft may be held in a determined relation for maintaining the locking ring in a determined locking relation with the demountable rim.

2. In a demountable rim construction for vehicle wheels the combination with a felly, of a bearing ring, a demountable rim, a locking ring circumferentially adjustable between the bearing ring and demountable rim including means for engaging the demountable rim, and a device for moving the locking ring relative to the felly to position the rim over the bearing ring including a bushing radially disposed in the felly providing a passageway therethrough, a shaft rotatably disposed in said bushing having a gear mounted on its outer end outwardly of the bearing ring, said locking ring having a slot therein provided with rack teeth longitudinally at one edge thereof, said gear lying within said slot with the teeth thereof in meshing relation with the rack teeth, said bushing having teeth thereon extending beyond the inner periphery of the felly, a squared portion rigid with said shaft outwardly of said bushing teeth, a sleeve longitudinally slidable and non-rotatably mounted on the squared portion having teeth thereon, and a spring normally urging the sleeve teeth into engagement with the teeth of the bushing whereby the shaft may be held in a fixed relation to maintain the locking ring in a definite locking relation with respect to the demountable rim.

3. A retainer for a demountable rim of vehicle wheel comprising in combination, a bearing ring provided with spaced apart circumferentially extending flanges, a demountable rim adapted to wedge on said flange when moved in one direction axially of the wheel, a locking ring circumferentially movable with respect to said bearing ring and disposed between said flanges thereof, said locking ring provided with a plurality of transverse and circumferentially disposed slots, said slots communicating in pairs to provide a plurality of L shaped ways in spaced apart relation, the transverse slots of each way open to one edge of the locking ring and the margin of the circumferential slot nearest to the said edge, in diverging relation thereto from the transverse slot, a plurality of wedges carried by the demountable rim at its internal periphery and in spaced apart relation, said wedges adapted to move in the transverse slot of the L-shaped ways when the rim is moved axially of the wheel in one direction and to present their wedging faces in operative relation to the said diverging faces of the circumferential slot of the L-shaped ways, and a device for moving said locking ring circumferentially of the bearing ring to cause the co-acting faces of the said lugs and locking ring to draw the demountable rim on the bearing ring.

4. A retainer for a demountable rim of vehicle wheel comprising in combination, a bearing ring provided with spaced apart circumferentially extending flanges, a demountable rim adapted to wedge on said flange when moved in one direction axially of the wheel, a locking ring circumferentially movable with respect to said bearing ring and disposed between said flanges thereof, said locking ring provided with a plurality of transverse and circumferentially disposed slots, said slots communicating in pairs to provide a plurality of L-shaped ways in spaced apart relation, the transverse slots of each way open to one edge of the locking ring and the margin of the circumferential slot nearest to the said edge, in diverging relation thereto from the transverse slot, a plurality of wedges carried by the demountable rim at its internal periphery and in spaced apart relation, said wedges adapted to move in the transverse slot of the L-shaped ways when the rim is moved axially of the wheel in one direction and to present their wedging faces in operative relation to the said diverging faces of the circumferential slot of the L-shaped ways, a rack carried by said locking ring extending circumferentially thereof, a pinion meshing with said rack, and means for rotating and locking said pinion.

5. A retainer for a demountable rim of vehicle wheel comprising in combination, a bearing ring provided with spaced apart circumferentially extending flanges, a demountable rim adapted to wedge on said flange when moved in one direction axially of the wheel, a locking ring circumferentially movable with respect to said bearing ring and disposed between said flanges thereof, said locking ring provided with a plurality of transverse and circumferentially disposed slots, said slots communicating in pairs to provide a plurality of L-shaped ways in spaced apart relation, the transverse slots of each way open to one edge of the locking ring and the margin of the circumferential slot nearest to the said edge, in diverging relation thereto from the transverse slot, a plurality of wedges carried by the demountable rim at its internal periphery and in spaced apart relation, said wedges adapted to move in the transverse slot of the L-shaped ways when the rim is moved axially of the wheel in one direction and to present their wedging faces in operative relation to the said diverging faces of the circumferential slot of the L-shaped ways, a rack carried by said locking ring extending circumferentially thereof, a pinion meshing with said rack, a shaft operable from the exterior of the wheel and operatively connected with said pinion for imparting movement thereto, and a locking device operatively connected with said shaft to prevent rotation thereof in a direction counter to that necessary for imparting movement to said locking ring for securing said demountable rim in place.

6. A retainer for a demountable rim of a vehicle wheel comprising in combination, a bearing ring provided with spaced apart circumferentially extending flanges, a demountable rim adapted to wedge on said flanges when moved in one direction axially of the wheel, a locking ring circumferentially movable with respect to said bearing ring and disposed between the said flanges thereof, said locking ring provided with a plurality of transverse and circumferentially disposed slots, said slots communicating in pairs to provide a plurality of L-shaped ways in spaced apart relation, the transverse slot of each way open to one edge of the locking ring and the margin of the circumferential slot nearest to the said edge, in diverging relation thereto from said transverse slot, anti-friction bearing carried by said locking ring and spacing the same from said bearing ring, a plurality of wedges carried by the demountable rim at its internal periphery and in spaced apart relation, said wedges adapted to move in the transverse slot of the L-shaped ways when the rim is moved axially of the wheel in one direction and to present their wedging faces in operative relation to the said diverging faces of the circumferential slot of the L-shaped ways, and a device for moving said locking ring circumferentially of the bearing ring to cause the co-acting faces of the said lugs and locking ring to draw the demountable rim on the bearing ring.

PAUL T. ILLIG.